(12) United States Patent
Sundaresan et al.

(10) Patent No.: US 11,971,473 B2
(45) Date of Patent: Apr. 30, 2024

(54) LOCATING OBJECTS IN INDOOR SPACES USING RADIO FREQUENCY BACKSCATTER TAGS

(71) Applicant: NEC Laboratories America, Inc., Princeton, NJ (US)

(72) Inventors: Karthikeyan Sundaresan, Manalapan, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 575 days.

(21) Appl. No.: 17/157,194

(22) Filed: Jan. 25, 2021

(65) Prior Publication Data

US 2021/0231792 A1 Jul. 29, 2021

Related U.S. Application Data

(60) Provisional application No. 62/966,670, filed on Jan. 28, 2020.

(51) Int. Cl.
*G01S 13/75* (2006.01)
*G01S 13/76* (2006.01)
*G06K 7/10* (2006.01)

(52) U.S. Cl.
CPC .......... *G01S 13/753* (2013.01); *G01S 13/758* (2013.01); *G01S 13/765* (2013.01); *G06K 7/10306* (2013.01)

(58) Field of Classification Search
CPC ... G01S 5/06; G01S 5/021; G01S 5/14; G01S 2013/466; G01S 13/878; G01S 5/0221; G01S 5/10; G01S 13/785; G01S 19/42; G01S 5/02213; G01S 5/0284; G01S 5/0226; G01S 11/06; G01S 13/02; G01S 5/0036; G01S 5/0009; G01S 5/26; G01S 13/75; G01S 2013/468; H04W 64/00; H04W 4/02; H04W 4/029; H04W 4/80; H04W 64/003; H04W 84/18; H04W 4/021; H04W 4/38; H04W 88/02; H04W 64/006; H04W 88/06; H04W 4/33; H04W 4/023; G06K 19/0723; G06K 7/10366; G06K 7/10306; G06K 17/0022; H01Q 5/25

See application file for complete search history.

(56) References Cited

U.S. PATENT DOCUMENTS 6,054,950 A * 4/2000 Fontana ............ G01S 5/06 342/464
10,819,319 B1 * 10/2020 Hyde ............ G06K 19/0715
(Continued)

*Primary Examiner* — Olumide Ajibade Akonai

(57) ABSTRACT

A product locating system is provided. The system includes at least one Radio Frequency (RF) backscatter transmitter configured to emit a main carrier RF signal that forms an excitation signal. The system further includes a passive RF backscatter tag associated with a product and configured to generate an Ultra-Wideband (UWB) signal from the excitation signal. The system also includes at least one RF backscatter receiver configured to simultaneously receive both the excitation signal from the at least one RF backscatter transmitter and the UWB signal from the passive RF backscatter tag, and compute the time-difference-of-arrival (TDoA) therebetween. TDoA information from multiple RF backscatter receivers, including the at least one RF backscatter receiver, is aggregated to compute the location of the product to which the passive RF backscatter tag is attached.

16 Claims, 5 Drawing Sheets

(56) References Cited

U.S. PATENT DOCUMENTS

| | | | |
|---|---|---|---|
| 2003/0013146 A1* | 1/2003 | Werb | G01V 15/00 |
| | | | 435/6.12 |
| 2003/0174086 A1* | 9/2003 | Hirt | G01S 5/06 |
| | | | 342/44 |
| 2008/0037512 A1* | 2/2008 | Aljadeff | G01S 5/021 |
| | | | 370/350 |
| 2011/0156878 A1* | 6/2011 | Wu | G01S 5/06 |
| | | | 340/10.1 |
| 2011/0169607 A1* | 7/2011 | Paulson | G01S 13/825 |
| | | | 340/10.1 |
| 2011/0181392 A1* | 7/2011 | Cha | G06K 7/0008 |
| | | | 340/8.1 |
| 2014/0035732 A1* | 2/2014 | Karr | G06K 7/10069 |
| | | | 340/10.5 |
| 2016/0178727 A1* | 6/2016 | Bottazzi | G06Q 30/06 |
| | | | 375/130 |
| 2019/0137613 A1* | 5/2019 | Yan | G01S 13/08 |
| 2020/0034583 A1* | 1/2020 | Nikitin | G06K 7/10128 |

* cited by examiner

LOCATING OBJECTS IN INDOOR SPACES USING RADIO FREQUENCY BACKSCATTER TAGS

RELATED APPLICATION INFORMATION

This application claims priority to U.S. Provisional Patent Application No. 62/966,670, filed on Jan. 28, 2020, incorporated herein by reference entirety.

BACKGROUND

Technical Field

The present invention relates to radio frequency tags and more particularly to locating objects in indoor spaces using radio frequency backscatter tags.

Description of the Related Art

Maintaining a competitive edge in the booming e-commerce industry requires retailers to run a very tight and efficient supply chain. Real-time visibility and tracking of assets in their warehouses and fulfillment centers forms a critical component in this endeavor, for which no cost-effective solutions exist today. While Radio Frequency (RF) based active localization solutions (e.g., Ultra-Wide Band (UWB)) can provide accurate tracking capabilities (1-2 m accuracy), they are expensive for a scalable deployment on assets; on the other hand, while passive RF tags (e.g., RF Identifiers (RFIDs) are cost-effective, they deliver poor localization accuracies.

SUMMARY

According to aspects of the present invention, a product locating system is provided. The system includes at least one Radio Frequency (RF) backscatter transmitter configured to emit a main carrier RF signal that forms an excitation signal. The system further includes a passive RF backscatter tag associated with a product and configured to generate an Ultra-Wideband (UWB) signal from the excitation signal. The system also includes at least one RF backscatter receiver configured to simultaneously receive both the excitation signal from the at least one RF backscatter transmitter and the UWB signal from the passive RF backscatter tag, and compute the time-difference-of-arrival (TDoA) therebetween. TDoA information from multiple RF backscatter receivers, including the at least one RF backscatter receiver, is aggregated to compute the location of the product to which the passive RF backscatter tag is attached.

According to other aspects of the present invention, a product locating method is provided. The method includes emitting, by at least one Radio Frequency (RF) backscatter transmitter, a main carrier RF signal that forms an excitation signal. The method further includes generating, by a passive RF backscatter tag associated with a product, an Ultra-Wideband (UWB) signal from the excitation signal. The method also includes simultaneously receiving, by at least one RF backscatter receiver, both the excitation signal from the at least one RF backscatter transmitter and the UWB signal from the passive RF backscatter tag, and computing the time-difference-of-arrival (TDoA) therebetween. TDoA information from multiple RF backscatter receivers, including the at least one RF backscatter receiver, is aggregated to compute the location of the product to which the passive RF backscatter tag is attached.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to locating objects in indoor spaces using radio frequency backscatter tags.

In one or more embodiments, a novel RF based localization system, called uShift, is proposed that brings together the benefits of both low-cost passive RF tags and the high localization accuracy offered by UWB.

uShift's design involves two components, a dual-band (UHF+UWB) RF transceiver that serve as beacons, and a passive (battery-less), low-cost UWB tag that can be scalably deployed on all assets. uShift's beacons leverage the UHF band to transmit over longer distances (better coverage) and provide energy to its tags, wherein the transmit signal is then converted into a UWB pulse signal and backscattered by its tags. Other beacons that receive the UHF (directly from transmitting beacons) and UWB (indirectly through the tag) signals, leverage the differential time of arrival between these signals at the beacon to infer the location of the tag. In an embodiment, a key feature of uShift is that it leverages the RF backscattered channel as a virtual distributed antenna of the transmitting beacon to aid in the localization of its tags, without the need for any synchronization between its beacons—a significant deployment and maintenance hurdle for most localization solutions today. uShift offers the advantage of real-time and accurate tracking of assets at a low cost of deployment and maintenance, and hence finds applications that span across numerous industry verticals.

Figure 1:
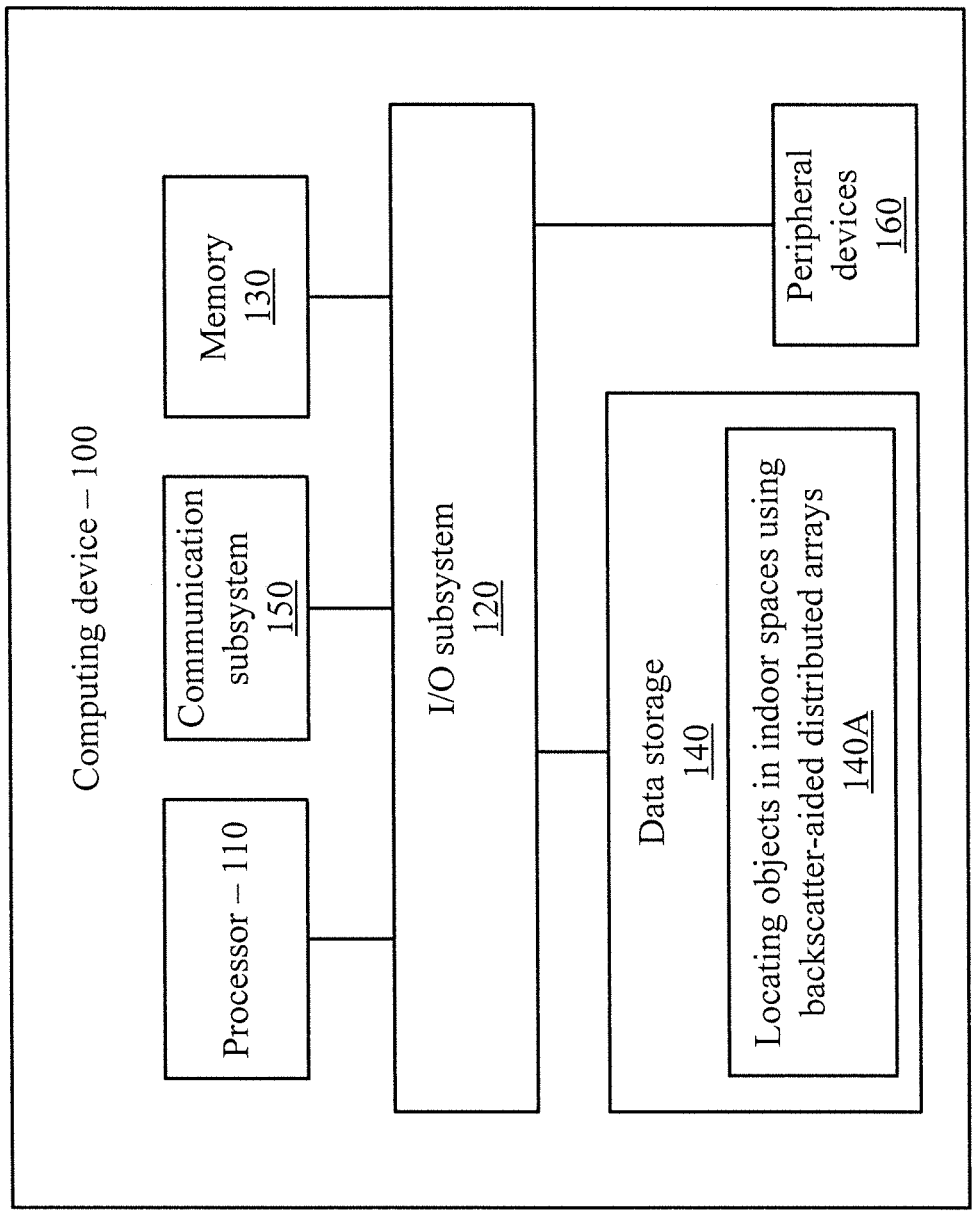
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to locate objects in indoor spaces using backscatter-aided distributed arrays.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for locating objects in indoor spaces using backscatter-aided distributed arrays. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
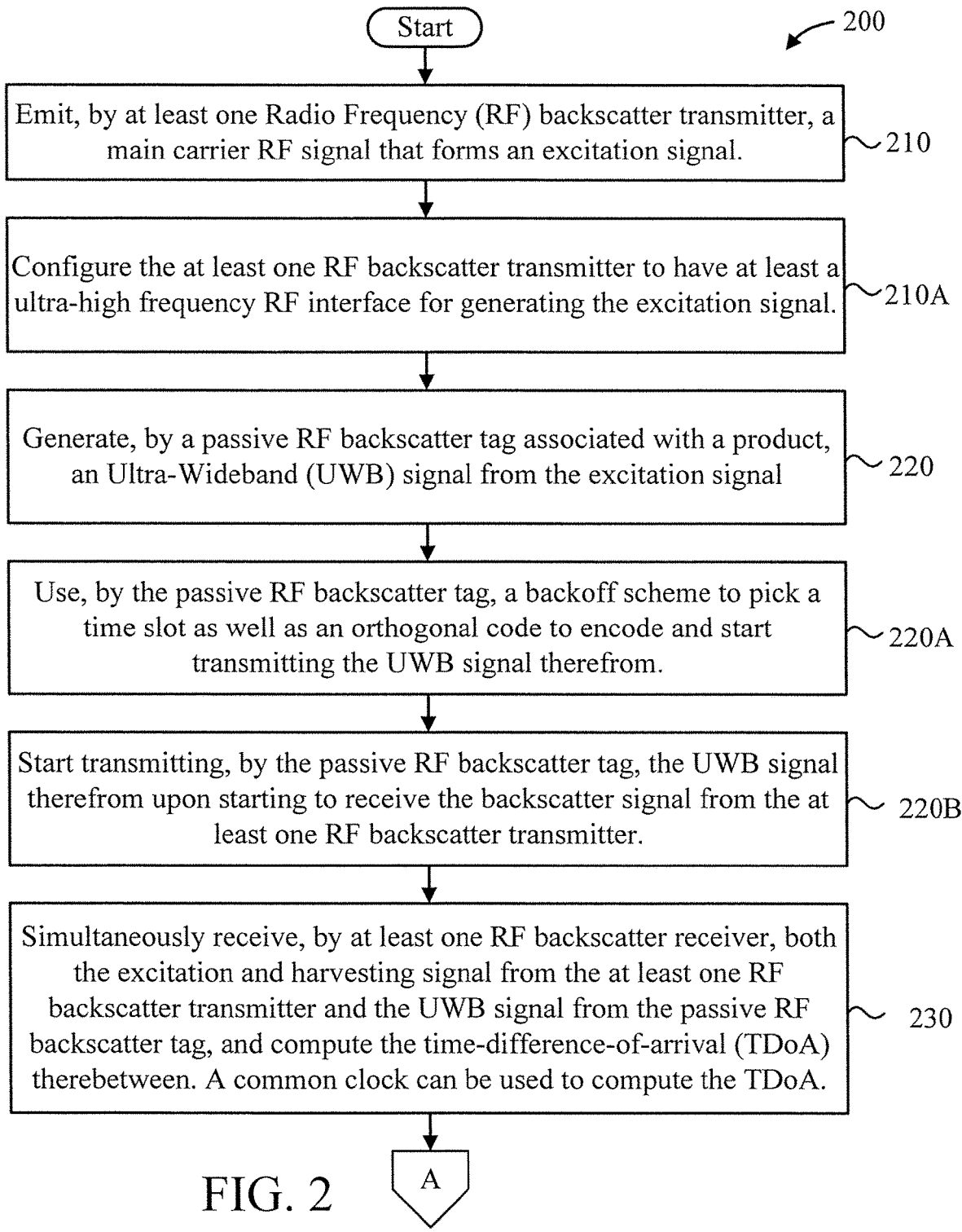
FIGS. 2-3 shows an exemplary method for locating objects in indoor spaces using backscatter-aided distributed arrays, in accordance with an embodiment of the present invention.
Figure 3:
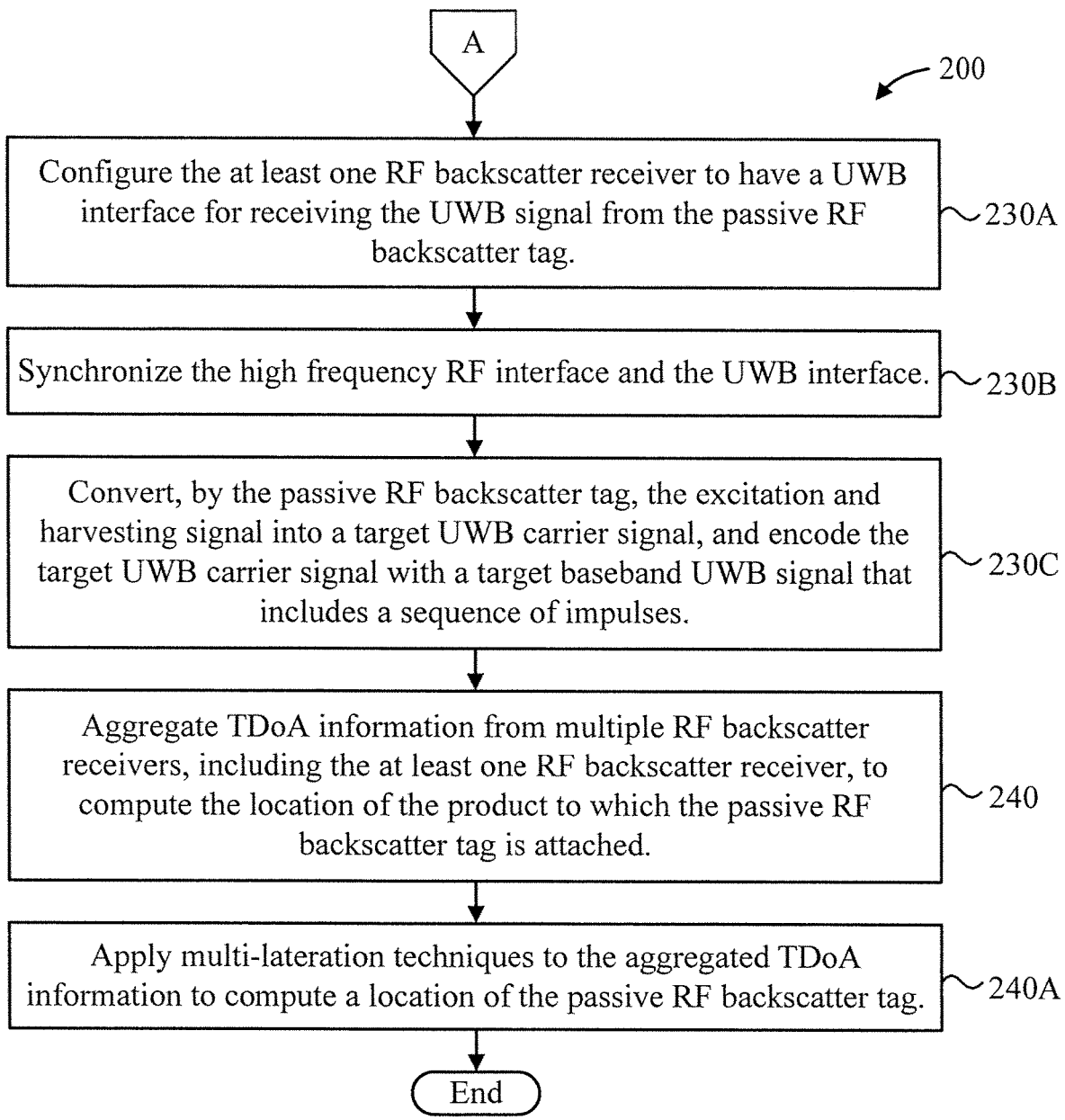

FIGS. 2-3 shows an exemplary method 200 for locating objects in indoor spaces using backscatter-aided distributed arrays, in accordance with an embodiment of the present invention.

In block 210, emit, by at least one Radio Frequency (RF) backscatter transmitter, a main carrier RF signal that forms an excitation signal.

In an embodiment, block 210 can include block 210A.

In block 210A, configure the at least one RF backscatter transmitter to have at least a ultra-high frequency RF interface for generating the excitation signal.

In block 220, generate, by a passive RF backscatter tag associated with a product, an Ultra-Wideband (UWB) signal from the excitation signal.

In an embodiment, block 220 can include one or more of blocks 220A and 220B.

In block 220A, use, by the passive RF backscatter tag, a backoff scheme to pick a time slot as well as an orthogonal code to encode and start transmitting the UWB signal therefrom.

In block 220A, start transmitting, by the passive RF backscatter tag, the UWB signal therefrom upon starting to receive the backscatter signal from the at least one RF backscatter transmitter.

In block 230, simultaneously receive, by at least one RF backscatter receiver, both the excitation signal from the at least one RF backscatter transmitter and the UWB signal from the passive RF backscatter tag, and compute the time-difference-of-arrival (TDoA) therebetween. In an embodiment, a common clock can be used to compute the TDoA. That is, the at least one RF backscatter receiver computes the time-difference-of-arrival (TDoA) between the excitation signal from the at least one Radio Frequency (RF) backscatter transmitter and the backscattered signal from the passive RF backscatter tag using a common clock.

In an embodiment, block 230 can include one or more of blocks 230A through 230CB.

In block 230A, configure the at least one RF backscatter receiver to have a UWB interface for receiving the UWB signal from the passive RF backscatter tag.

In block 230B, synchronize the high frequency RF interface and the UWB interface.

In block 230C, convert, by the passive RF backscatter tag, the excitation signal into a target UWB carrier signal, and encode the target UWB carrier signal with a target baseband UWB signal that includes a sequence of impulses.

In block 240, aggregate TDoA information from multiple RF backscatter receivers, including the at least one RF backscatter receiver, to compute the location of the product to which the passive RF backscatter tag is attached.

In an embodiment, block 240 can include block 240A.

In block 240A, apply multi-lateration techniques to the aggregated TDoA information to compute a location of the passive RF backscatter tag.

uShift: PROPOSED APPROACH according to one illustrative embodiment.

Figure 4:
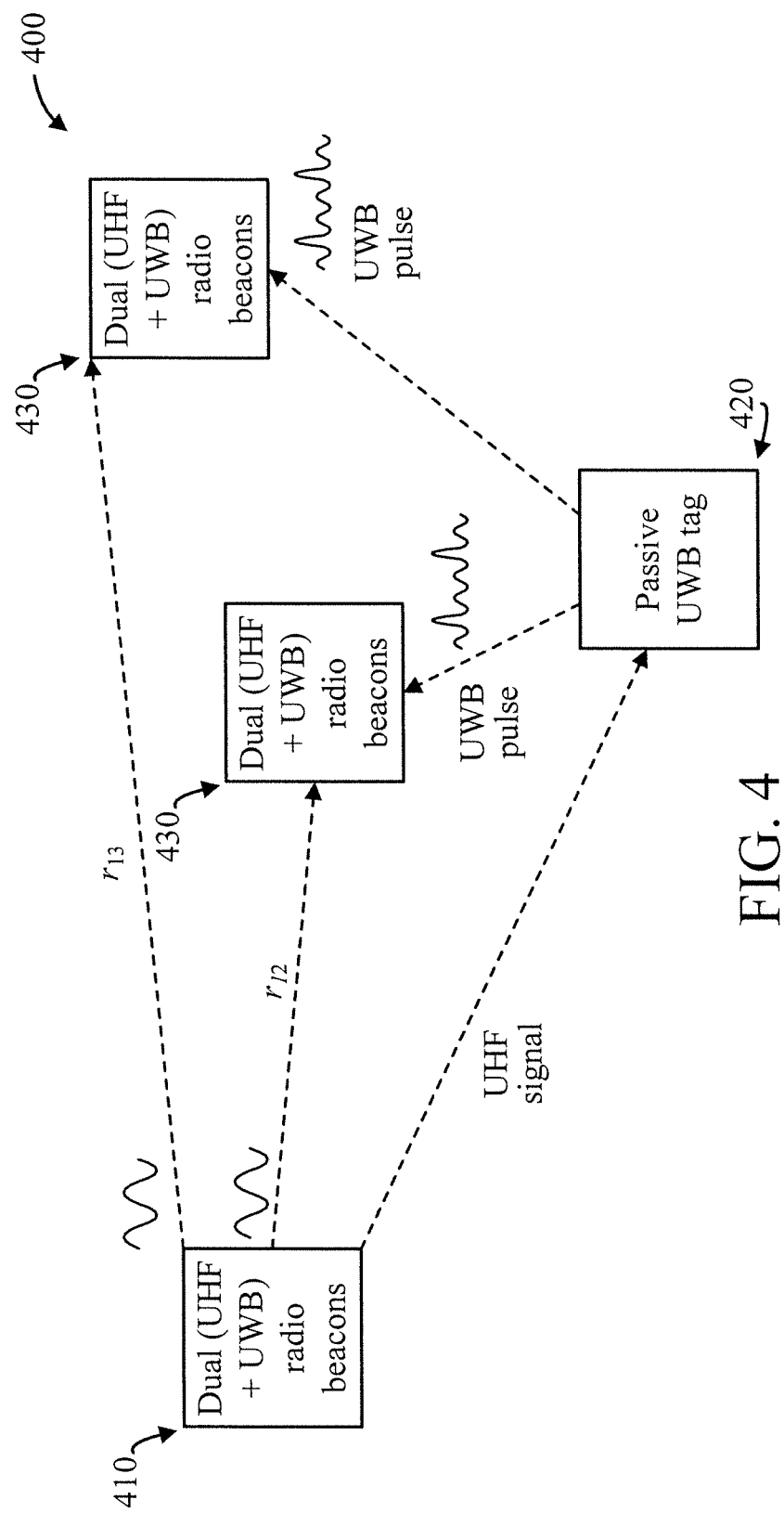
FIG. 4 is a block diagram showing an exemplary configuration, in accordance with an embodiment of the present invention.

Typically, when passive RF tags are employed for localization of assets, their severe energy limitation prevents them from executing two-way ranging operations with an anchor beacon. Localization is achieved in such cases by allowing the passive tags to send a one-way signal, which is received by multiple anchor beacons; the time-difference-of-arrival (TDoA) across multiple, synchronized beacons is then collectively used to locate the tag. Essentially, the burden of synchronization that is needed between tag and individual anchor beacons (achieved through TWR) is now shifted to the need for synchronization across anchor beacons (in lieu of the TWR capability at tags).

uShift's Design uShift's novel design involves two components to overcome these challenges, namely, a dual-band (UHF+UWB) active RF transceiver that serve as static (anchor) beacons, and a passive (battery-less), low-cost Ultra-Wide Band (UWB) tag that can be scalably deployed on all static and mobile assets, as shown in FIG. 4. FIG. 4 is a block diagram showing an exemplary configuration 400, in accordance with an embodiment of the present invention. uShift's beacons 410 leverage the Ultra-High Frequency (UHF) band (higher power) to transmit over longer distances (better coverage) and deliver energy to its tags 420, wherein the transmit signal is then converted into a UWB pulse signal at the tag 420 and backscattered by it. Other beacons 430 that receive the UHF (directly from transmitting beacons) and UWB (indirectly through the tag) signals, leverage the time difference of arrival (TDoA) between these signals locally at each of the beacons to collectively infer the location of the tag 420.

The receiving beacons have their dual radios (UWF and UWB) synchronized by a common clock locally, which allows for the TDoA to have a uniform, high resolution across both the radios. The transmitting beacon can use different UHF signals to differentiate between energy harvesting and backscattering phases of the process—the use of a specific UHF signal could be an indication for the tag to start its backscattering operation, while also indicating to the receive beacons which signals to employ for their TDoA estimation.

The sequence of operations in uShift during the localization of a tag is as follows. While uShift works for 3D localization, for ease of discussions, we consider a 2D localization example. Let there by n static beacons (set B) deployed in the environment at known locations $(x_i; y_i)$ for a beacon $i \in B$. Let the target tag on asset a be at an unknown location $(x_a; y_a)$. Let $t_{ij}$ be the TDoA between the UHF and UWB signals sent by beacon i and tag a respectively, and received at beacon j. Now for i as the transmitting beacon, and $j \in B\setminus i$ as the receiving beacons, the following system of equations need to hold good, namely, $$\sqrt{(x_a-x_i)^2+(y_a-y_i)^2}+\sqrt{(x_a-x_j)^2+(y_a-y_j)^2}=r_{ij}+C\cdot t_{ij}, \forall j \in B\setminus i$$

where, $r_{ij}$ is the distance between beacons i and j (known from their locations) and C is the speed of light. The above equations capture the difference in the ranges of the paths taken by the two signals with respect to their TDoA. With the above set of equations, the only unknown, namely the tag's location $(x_a; y_a)$ can be inferred using standard quadratic optimization techniques.

Auto-Calibration of Beacons

While the location of anchor beacons are typically assumed to be known during deployment, this can potentially pose a burden for seamless operation. Specifically, this would require personnel to note exactly where the beacons are placed, and also constantly track and update their location, should they be moved from their location for any reason (e.g., construction, renovation, etc.). These are tedious requirements that can be potential obstacles for the deployment and adaptation (to environment changes) of a localization solution, and hence its adoption.

uShift can avoid the need for such requirements by enabling auto-configuration of the beacons. This is achieved by determining the location of all the beacons automatically with respect to a given reference beacon by conducting on-demand UWB ranging (TWR) estimates $(r_{ij})$ between different pairs of beacons. Essentially, by intelligently performing range estimates between different pairs of beacons, uShift can jointly infer the topology formed by all the beacons and hence their locations $((x_i; y_i))$ with respect to a reference beacon (as the origin).

Scalable Coverage and Multiple Access of Tags

The key innovation in uShift is that it leverages the RF backscattered channel as a virtual distributed antenna of the transmitting beacon to aid in the localization of its tags, without the need for any synchronization between its beacons—a significant deployment and maintenance hurdle for most localization solutions today. Indeed, the elimination of synchronization across beacons, allows each of the beacons to seamlessly take turns as transmitters (while other beacons in the neighborhood serve as receivers), thereby illuminating tags in different regions of the environment and localizing them in a highly scalable manner.

Figure 5:
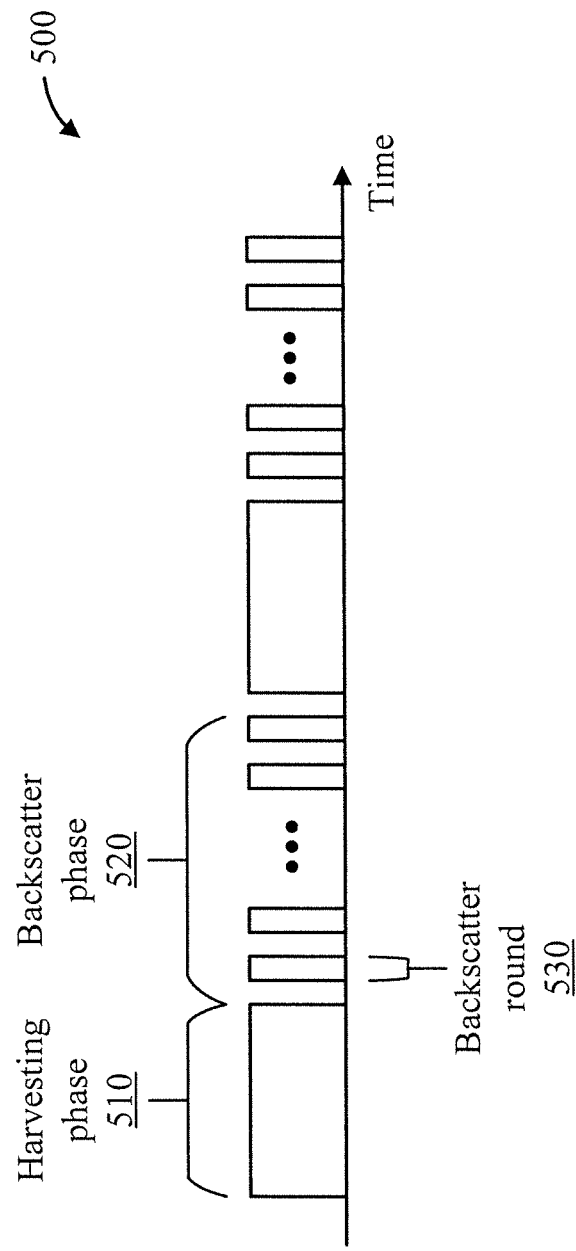
FIG. 5 is a diagram showing uShift's localization solution, in accordance with an embodiment of the present invention.

In an embodiment, uShift's operation involves two phases as shown in FIG. 5: the harvesting phase 510, followed by the backscattering phase 520. FIG. 5 is a diagram showing uShift's localization solution 500, in accordance with an embodiment of the present invention. The backscattering phase is in turn composed of multiple rounds. When a transmitting beacon illuminates multiple tags in the neighborhood (harvesting phase), each of the tags forms a virtual two-antenna distributed array with the transmitting beacon that in turn aids in its localization. Since the simultaneous backscatter from multiple tags can lead to collisions at the receive beacons during the backscattering phase, two mechanisms are employed in uShift: (i) each tag probabilistically determines if it should participate in a round 330 of backscattering (allows for distributing tags' access to different rounds); and (ii) each tag employs a different, orthogonal code for encoding its UWB pulses during backscattering. Hence, even among the set of tags that participate in a given backscattering round, their orthogonal pulse sequences can be differentiated at the receive beacons and the appropriate TDoAs can be estimated for the different tags.

Use Cases

By offering the advantage of real-time and accurate tracking of assets at a low cost of deployment and maintenance, uShift finds applications that span across numerous industry verticals.

Warehouses and fulfillment centers: Several assets such as equipment, tools, vehicles, crates, etc. are employed in day-to-day operations and need to be tracked in real-time for their availability and usage. This has a direct impact on the efficient operation of the center as a whole.

Event centers: Event centers such as convention centers, sports venues, stadiums, etc. can leverage uShift's low-cost passive tags for tracking their security personnel in real-time in GPS denied environments. Further, tourist centers such as museums, zoos, heritage sites, etc. can leverage uShift's tags attached to customers' tickets (passes) to deliver appropriate information on their smart devices (phones, wearables, etc.) based on their location.

Industrial automation: Autonomous systems such as ground robots, micro UAVs, etc., are starting to deliver value in industrial automation. uShift's tags can be attached to such autonomous systems to aid in their navigation indoors.

Store fronts: uShift's tags can also be used to track high-valued items, such as jewelry, bags, electronics, etc., in store fronts. This can help with tracking misplaced items, as well as detecting those that go beyond the perimeter of the store without being purchased.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A product locating system, comprising:
   at least one Radio Frequency (RF) backscatter transmitter configured to emit a main carrier RF signal that forms an excitation signal;
   a passive RF backscatter tag associated with a product and configured to generate an Ultra-Wideband (UWB) signal from the excitation signal; and
   at least one RF backscatter receiver configured to simultaneously receive both the excitation signal from the at least one RF backscatter transmitter and the UWB signal from the passive RF backscatter tag, and compute a time-difference-of-arrival (TDoA) therebetween;
   wherein TDoA information from multiple backscatter receivers, including the at least one RF backscatter receiver, is aggregated to compute the location of the product to which the passive RF backscatter tag is attached;
   wherein different RF backscatter transmitters send an excitation signal at different times to activate passive RF backscatter tags in different regions of deployment; and
   wherein at least one RF backscatter transmitter first sends a harvesting signal used for energy harvesting by the passive RF scatter tag, followed by a backscatter signal to initiate tag transmission.

2. The product locating system of claim 1, wherein the at least one RF backscatter transmitter and the at least one RF backscatter receiver have at least an ultra-high frequency RF interface for generating the excitation signal and a UWB interface for receiving the UWB signal from the passive RF backscatter tag, respectively.

3. The product locating system of claim 2, wherein the ultra-high frequency RF interface and the UWB interface are synchronized.

4. The product locating system of claim 1, wherein the passive RF backscatter tag converts the excitation signal into a target UWB carrier signal and encodes the target UWB carrier signal with a target baseband UWB signal that comprises a sequence of impulses.

5. The product locating system of claim 1, wherein the at least one RF backscatter receiver computes the time-difference-of-arrival (TDoA) between the excitation signal from the at least one Radio Frequency (RF) backscatter transmitter and the backscattered signal from the passive RF backscatter tag using a common clock.

6. Product locating system of claim 1, wherein the passive RF backscatter tag starts transmitting the UWB signal therefrom upon starting to receive the backscatter signal from the at least one RF backscatter transmitter.

7. The product locating system of claim 1, wherein the passive RF backscatter tag uses a backoff scheme to pick a time slot as well as an orthogonal code to encode and start transmitting the UWB signal therefrom.

8. The product locating system of claim 1, wherein the TDoA computations of the passive RF backscatter tag from multiple RF backscatter receivers, including the at least one RF backscatter receiver, are aggregated and multi-lateration techniques applied thereto to compute a location of the passive RF backscatter tag.

9. A product locating method, comprising:
   emitting, by at least one Radio Frequency (RF) backscatter transmitter, a main carrier RF signal that forms an excitation signal;
   generating, by a passive RF backscatter tag associated with a product, an Ultra-Wideband (UWB) signal from the excitation signal; and
   simultaneously receiving, by at least one RF backscatter receiver, both the excitation signal from the at least one RF backscatter transmitter and the UWB signal from the passive RF backscatter tag, and computing a time-difference-of-arrival (TDoA) therebetween;
   wherein TDoA information from multiple RF backscatter receivers, including the at least one RF backscatter receiver, is aggregated to compute the location of the product to which the passive RF backscatter tag is attached; and
   wherein different RF backscatter transmitters send an excitation signal at different times to activate passive RF backscatter tags in different regions of deployment; and further comprising:
   sending, by the at least one RF backscatter transmitter, a harvesting signal used for energy harvesting by the passive RF backscatter tag; and
   sending, by the at least one RF backscatter transmitter a backscatter signal to initiate tag transmission.

10. The product locating method at claim 9, further comprising:
    configuring the at least one RF backscatter transmitter to have at least an ultra-high frequency RF interface for generating the excitation signal; and
    configuring the at least one RF backscatter receiver to have a UWB interface for receiving the UWB signal from the passive RF backscatter tag.

11. The product locating method of claim 10, further comprising synchronizing the ultra-high frequency RF interface and the UWB interface.

12. The product locating method of claim 9, further comprising:
    converting, by the passive RF backscatter tag, the excitation signal into a target UWB carrier signal; and
    encode the target UWB carrier signal with a target baseband UWB signal that comprises a sequence of impulses.

13. The product locating method of claim 9, wherein the at least one RF backscatter receiver computes the time-difference-of-arrival (TDoA) between the excitation signal from the at least one Radio Frequency (RF) backscatter transmitter and the backscattered signal from the passive RF backscatter tag using a common clock.

14. The product locating method of claim 9, wherein the passive RF backscatter tag starts transmitting the UWB signal therefrom upon starting to receive the backscatter signal from the at least one RF backscatter transmitter.

15. The product locating method of claim 9, wherein the passive RF backscatter tag uses a backoff scheme to pick a time slot as well as an orthogonal code to encode and start transmitting the UWB signal therefrom.

16. The product locating method of claim 9, wherein the TDoA computations of the passive RF backscatter tag from multiple RF backscatter receivers, including the at least one RF backscatter receiver, are aggregated and multi-lateration techniques applied thereto to compute a location of the passive RF backscatter tag.

* * * * *